US012499601B2

(12) United States Patent
Davidson et al.

(10) Patent No.: US 12,499,601 B2
(45) Date of Patent: Dec. 16, 2025

(54) GENERATION AND SIMULTANEOUS DISPLAY OF MULTIPLE DIGITALLY GARMENTED AVATARS

(71) Applicant: SpreeAI Corporation, Incline Village, NV (US)

(72) Inventors: Robert Meyer Davidson, Incline Village, NV (US); Gil Spencer, Incline Village, NV (US); Dmitriy Vladlenovich Pinskiy, Woodland Hills, CA (US); Evan Smyth, La Crescenta, CA (US)

(73) Assignee: SpreeAI Corporation, Incline Village, NV (US)

( * ) Notice: Subject to any disclaimer, the term of this patent is extended or adjusted under 35 U.S.C. 154(b) by 61 days.

(21) Appl. No.: 17/719,934

(22) Filed: Apr. 13, 2022

(65) Prior Publication Data

US 2022/0237846 A1 Jul. 28, 2022

Related U.S. Application Data

(63) Continuation-in-part of application No. 17/706,420, filed on Mar. 28, 2022, now Pat. No. 12,254,561, and
(Continued)

(51) Int. Cl.
*G06T 13/40* (2011.01)
*B29C 64/393* (2017.01)
(Continued)

(52) U.S. Cl.
CPC ............ *G06T 13/40* (2013.01); *B29C 64/393* (2017.08); *B33Y 50/02* (2014.12); *G06T 15/205* (2013.01);
(Continued)

(58) Field of Classification Search
CPC ....... G06T 13/40; G06T 15/205; G06T 19/20; G06T 2210/16; G06T 2215/16; G06T 2219/2021; B33Y 50/02; B29C 64/393
See application file for complete search history.

(56) References Cited

U.S. PATENT DOCUMENTS 6,466,215 B1   10/2002   Matsuda et al.
6,546,309 B1 *  4/2003   Gazzuolo ............... G06T 17/20
                                                 702/167
(Continued)

FOREIGN PATENT DOCUMENTS

CN       110930500 A       3/2020
WO     2014161429 A1      10/2014
(Continued)

OTHER PUBLICATIONS

Goes, F. et al., "Garment Refitting for Digital Characters", SIGGRAPH '20 Talks, Aug. 17, 2020, Virtual Event, USA; 2 pages. ACM ISBN 978-1-4503-7971-7/20/08. https://doi.org/10.1145/3388767.3407348.
(Continued)

*Primary Examiner* — Abderrahim Merouan
(74) *Attorney, Agent, or Firm* — FIG. 1 Patents

(57) ABSTRACT

Systems and methods for generating and simultaneously displaying multiple photorealistic digital avatars wearing garments. One specific method embodiment comprises the steps of: receiving a selection of one or more garments from a user; producing an electronic avatar for each of the selected garments; retrieving a plurality of body measurements of the user; generating a multi-dimensional space based upon the plurality of body measurements of the user; generating an interpolation measurement space for each electronic avatar for each of the selected garments, with each avatar wearing a selected garment; interpolating between two avatars to generate a realistic customized electronic
(Continued)

avatar of the user wearing one of the garments; adding photorealistic imagery of the user's face and hair to each rendered customized animated garmented avatar to create a complete digital garmented avatar for the user for each of the selected garments; transmitting each complete digital garmented avatar to a user device; and simultaneously displaying on the user device each complete digital garmented avatar.

20 Claims, 6 Drawing Sheets

Related U.S. Application Data a continuation-in-part of application No. 17/357,394, filed on Jun. 24, 2021, now abandoned, and a continuation-in-part of application No. 17/231,325, filed on Apr. 15, 2021, now Pat. No. 11,663,764, said application No. 17/706,420 is a continuation-in-part of application No. 17/231,325, filed on Apr. 15, 2021, now Pat. No. 11,663,764.

(60) Provisional application No. 63/175,001, filed on Apr. 14, 2021, provisional application No. 63/132,173, filed on Dec. 30, 2020, provisional application No. 63/142,294, filed on Jan. 27, 2021.

(51) Int. Cl.
  *B33Y 50/02* (2015.01)
  *G06T 15/20* (2011.01)
  *G06T 19/20* (2011.01)

(52) U.S. Cl.
  CPC .......... *G06T 19/20* (2013.01); *G06T 2210/16* (2013.01); *G06T 2215/16* (2013.01); *G06T 2219/2021* (2013.01)

(56) References Cited

U.S. PATENT DOCUMENTS

| | | | |
|---|---|---|---|
| 6,614,431 B1 * | 9/2003 | Collodi | G06T 15/80 345/426 |
| 6,731,287 B1 | 5/2004 | Erdem | |
| 9,412,192 B2 * | 8/2016 | Mandel | G06T 13/40 |
| 10,255,681 B2 | 4/2019 | Price et al. | |
| 10,311,508 B2 * | 6/2019 | Reed | A41H 3/007 |
| 10,628,666 B2 * | 4/2020 | Sareen | G06T 19/00 |
| 10,706,636 B2 * | 7/2020 | Selvarajan | G06T 19/20 |
| 10,872,475 B2 * | 12/2020 | Aluru | G06T 15/04 |
| 10,936,853 B1 | 3/2021 | Sethi et al. | |
| 11,087,392 B2 * | 8/2021 | Singh | G06Q 10/0833 |
| 11,308,445 B2 * | 4/2022 | Singh | G07F 9/001 |
| 2007/0091085 A1 | 4/2007 | Wang et al. | |
| 2007/0188502 A1 | 8/2007 | Bishop | |
| 2009/0066700 A1 | 3/2009 | Harding et al. | |
| 2013/0066750 A1 | 3/2013 | Siddique et al. | |
| 2013/0100140 A1 | 4/2013 | Ye et al. | |
| 2013/0314412 A1 | 11/2013 | Gravois et al. | |
| 2015/0154691 A1 | 6/2015 | Curry et al. | |
| 2015/0351477 A1 * | 12/2015 | Stahl | G06T 15/04 700/132 |
| 2016/0163084 A1 | 6/2016 | Corazza et al. | |
| 2016/0209929 A1 * | 7/2016 | Trisnadi | G06F 3/0304 |
| 2016/0247017 A1 | 8/2016 | Sareen et al. | |
| 2016/0284018 A1 | 9/2016 | Adeyoola et al. | |
| 2017/0004657 A1 | 1/2017 | Zagel et al. | |
| 2017/0080346 A1 | 3/2017 | Abbas | |
| 2018/0047200 A1 | 2/2018 | O'Hara et al. | |
| 2018/0197347 A1 | 7/2018 | Tomizuka | |
| 2018/0240280 A1 * | 8/2018 | Chen | G06T 19/20 |
| 2018/0240281 A1 | 8/2018 | Vincelette | |
| 2019/0035149 A1 | 1/2019 | Chen et al. | |
| 2019/0130649 A1 | 5/2019 | O'Brien et al. | |
| 2019/0156541 A1 * | 5/2019 | Isgar | G06F 40/186 |
| 2019/0287301 A1 | 9/2019 | Colbert | |
| 2019/0371032 A1 | 12/2019 | Scapel et al. | |
| 2020/0066029 A1 | 2/2020 | Chen et al. | |
| 2020/0126316 A1 * | 4/2020 | Sharma | G06T 17/20 |
| 2020/0151807 A1 * | 5/2020 | Zhou | G06N 3/045 |
| 2020/0234508 A1 | 7/2020 | Shaburov et al. | |
| 2020/0258280 A1 | 8/2020 | Park et al. | |
| 2020/0294294 A1 | 9/2020 | Petriv et al. | |
| 2020/0306640 A1 | 10/2020 | Kolen et al. | |
| 2020/0320769 A1 | 10/2020 | Chen et al. | |
| 2020/0334867 A1 | 10/2020 | Chen et al. | |
| 2020/0346420 A1 | 11/2020 | Friedrich | |
| 2020/0364533 A1 * | 11/2020 | Sareen | G06T 19/00 |
| 2020/0402307 A1 * | 12/2020 | Tanwer | G06T 15/005 |
| 2021/0049811 A1 * | 2/2021 | Fedyukov | G06T 7/60 |
| 2021/0056767 A1 * | 2/2021 | Oh | G06V 40/103 |
| 2021/0150187 A1 | 5/2021 | Karras et al. | |
| 2021/0303919 A1 | 9/2021 | Niu | |

FOREIGN PATENT DOCUMENTS

| | | |
|---|---|---|
| WO | 2017029488 A2 | 2/2017 |
| WO | 2017143392 A1 | 8/2017 |
| WO | 2018089039 A1 | 5/2018 |
| WO | 2018154331 A1 | 8/2018 |
| WO | 2019050808 A1 | 3/2019 |
| WO | 2019164266 A1 | 8/2019 |
| WO | 2020038254 A1 | 2/2020 |
| WO | 2020104990 A1 | 5/2020 |
| WO | 2022221398 A1 | 10/2022 |

OTHER PUBLICATIONS

Burkov, "Neural Head Reenactment with Latent Pose Descriptors", Procedings of the IEEE/CVF Conference on Computer Vision and Pattern Recognition (CVPR) 2020, pp. 13766-13795; Oct. 30, 2020. https://arxiv.org/pdf/2004.12000.

Deng, "Disentangled and Controllable Face Image Generation via 3D Imitative-Contrastive Learning", Computer Vision Foundation Conference, Proceedings of the IEEE/CVF Conference on Computer Vision and Pattern Recognition (CVPR) 2020, pp. 5154-5163; open access version. https://arxiv.org/abs/1904.01909.

Tripathy, "ICface: Interpretable and Controllable Face Reenactment Using GANs", Procedings of the IEEE/CVF Winter Conference on Applications of Computer Vision (WACV) 2020, pp. 3385-3394; Jan. 17, 2020. https://arxiv.org/abs/1904.01909.

Huang, "Learning Identity-Invariant Motion Representations for Cross-ID Face Reenactment", Procedings of the IEEE/CVF Conference on Computer Vision and Pattern Recognition (CVPR) 2020, pp. 7084-7092, 2020, open access version, https://openaccess.thecvf.com/content_CVPR_2020/html/Huang_Learning_Identity-Invariant_Motion_Representations_for_Cross-ID_Face_Reenactment_CVPR_2020_paper.html.

Thies, "Face2Face: Real-Time Face Capture and Reenactment of RGB Videos", Jul. 29, 2020; abstract of this paper published in 2016 by IEEE at https://ieeexplore.ieee.org/document/7780631.

Zhao, "Joint face alignment and segmentation via deep multi-task learning", published in Multimedia Tools and Applications 78, 13131-13148 (2019), published by Springer Nature, 1 New York Plaza, Suite 4600, New York, NY 10004-1562, U.S.A., Jan. 12, 2018 https://doi.org/10.1007/s11042-018-5609-1.

Li, "FaceShifter: Towards High Fidelity and Occlusion Aware Face Swapping", Peking University and Microsoft Research, Sep. 15, 2020. lililngzhi@pku.edu.cn and jianbao.haya.doch.fangwen@microsoft.com; pdf version available at: https://arxiv.org/pdf/1912.13457.pdf.

Nirkin, "FSGAN: Subject Agnostic Face Swapping and Reenactment", Computer Vision Foundation, ICCV 2019, open access version, Aug. 2019, https://arxiv.org/pdf/1908.05932.pdf ; also published in Proceedings of the IEEE International Conference on Computer Vision, pp. 7184-7193 and on Yuval Nirkin's website: https://nirkin.com/fsgan/.

(56) References Cited

OTHER PUBLICATIONS

Naruniec, "High-Resolution Neural Face Swapping for Visual Effects", Eurographics Symposium on Rendering 2020, vol. 39 (2020), No. 4. https://studios.disneyresearch.com/wp-content/uploads/2020/06/High-Resolution-Neural-Face-Swapping-for-Visual-Effects.pdf; also published by the Eurographics Association, c/o Fiduciare A. Richard SA, Avenue de Frontenex 32, 1207 Geneva, Switzerland, IDE CHE-100.558.3722020 https://diglib.eg.org/andle/10.2312/2632924.

Wawrzonowski et al. "Mobile devices' GPUs in cloth dynamics simulation", Proceedings of the Federated Conference on Computer Science and Information Systems, Prague, Czech Republic, 2017, pp. 1283-1290. Retrieved on Feb. 23, 2022. Retrieved from UKL: https://annals-csis.orgVolume_11/drp/pdf/191.pdf.

International Preliminary Report on Patentability (issued by the USPTO/RO as the designated IPEA, after the filing of an Article 34 Amendment) mailed Oct. 11, 2023 for PCT/US2022/022180 with an international filing date of Mar. 28, 2022; 12 pages.

Lewis et al., "Pose Space Deformation: A Unified Approach to Shape Interpolation and Skeleton-Driven Deformation", SIGGRAPH 2000, New Orleans, Louisiana, USA, pp. 165-172.

Neophytou et al., "Shape and Pose Space Deformation for Subject Specific Animation", Centre for Vision Speech and Signal Processing (CVSSP), University of Surrey, Guildford, United Kingdom; IEEE Conference Publication, IEEE Xplore, 2013, 8 pages.

"Pose space deformation," article in Wikipedia, downloaded Jul. 29, 2022, 2 pages.

Kim et al., "Deep Video Portraits", ACM Trans. Graph, vol. 37, No. 4, Article 163; published online May 29, 2018, pp. 163:1-163:14; Association for Computing Machinery, U.S.A. https://arxiv.org/pdf/1805.11714.pdf.

PCT/US2022/024601, "International Preliminary Report on Patentability", PCT Application No. PCT/US2022/024601, Aug. 16, 2024, 33 pages.

"Extended European Search Report", EP Application No. 22746447.6, Dec. 16, 2024, 6 pages.

"Extended European Search Report", EP Application No. 22788638.9, Dec. 13, 2024, 7 pages.

"EP Search Report", EP Application No. 22788848.4, Jan. 20, 2025, 6 pages,.

"Foreign Office Action", EP Application No. 22788848.4, Feb. 6, 2025, 1 page.

Lewis, et al., "Vogue: Try-On by StyleGAN Interpolation Optimization", Cornell University Library, Ithaca NY, Jan. 6, 2021, 15 pages.

* cited by examiner

GENERATION AND SIMULTANEOUS DISPLAY OF MULTIPLE DIGITALLY GARMENTED AVATARS

RELATED APPLICATIONS

This patent application is a continuation-in-part of commonly owned U.S. patent application Ser. No. 17/706,420 filed Mar. 28, 2022; this patent application is also a continuation-in-part of commonly owned U.S. patent Ser. No. 17/357,394 filed Jun. 24, 2021; this patent application is also a continuation-in-part of commonly owned U.S. patent application Ser. No. 17/231,325 filed Apr. 15, 2021; and this patent application claims the benefit of commonly owned U.S. provisional patent application 63/175,001 filed Apr. 14, 2021; U.S. patent application Ser. No. 17/706,420 filed Mar. 28, 2022 is a continuation-in-part of U.S. patent application Ser. No. 17/231,325, which claims the benefit of commonly owned U.S. provisional patent application 63/142,294 filed Jan. 27, 2021; and U.S. patent application Ser. No. 17/357, 394 filed Jun. 24, 2021 claims the benefit of commonly owned U.S. provisional patent application 63/132,173 filed Dec. 30, 2020; all of these previously filed commonly owned patent applications are hereby incorporated in their entireties into the present patent application.

FIELD OF THE INVENTION

The present invention pertains to systems and methods for the generation and display of photorealistic customized and garmented avatars. In particular, the present invention provides for the generation and simultaneous display of multiple digitally garmented avatars.

BACKGROUND ART

The conventional method of trying on and comparing garments is outdated, time consuming, and ineffective. Currently, when an individual walks into a store to pick out a selection of garments to try on and potentially purchase, the individual has no effective way to compare how these garments look when worn, or to compare garments against each other when worn. The wearer cannot accurately recall what the last item looked like on her, and be able to compare the worn garments accurately and effectively. Shoppers usually attempt to compare items by wearing each garment and taking a photograph (selfie or reflection in a mirror) of themselves using their cell phone or other mobile device, and then comparing the photos of the different garments as worn. These photos are not usually taken from optimal angles and positions, and are not able to accurately reproduce and convey how the garments look when worn by the individual. Furthermore, while online stores that sell fashion items and garments may provide photos of several garments simultaneously, or show models wearing the garments, these photos rarely translate to how the garments look on the individual interested in making the purchase. The present invention provides solutions to these problems.

DISCLOSURE OF INVENTION

Systems and methods for generating and simultaneously displaying multiple photorealistic digital avatars wearing garments. A specific method embodiment comprises the steps of: receiving a selection of one or more garments from a user; producing an electronic avatar for each of the selected garments; retrieving a plurality of body measurements of the user; generating a multi-dimensional space based upon the plurality of body measurements of the user; generating an interpolation measurement space for each electronic avatar for each of the selected garments, with each avatar wearing a selected garment; interpolating between two avatars to generate a realistic customized electronic avatar of the user wearing one of the garments; adding photorealistic imagery of the user's face and hair to each rendered customized animated garmented avatar to create a complete digital garmented avatar for the user for each of the selected garments; transmitting each complete digital garmented avatar to a user device; and simultaneously displaying on the user device each complete digital garmented avatar.

BRIEF DESCRIPTION OF THE DRAWINGS

In the description, for purposes of explanation and not limitation, specific details are set forth, such as particular embodiments, procedures, techniques, etc. to provide a thorough understanding of the present invention. However, it will be apparent to one skilled in the art that the present invention may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
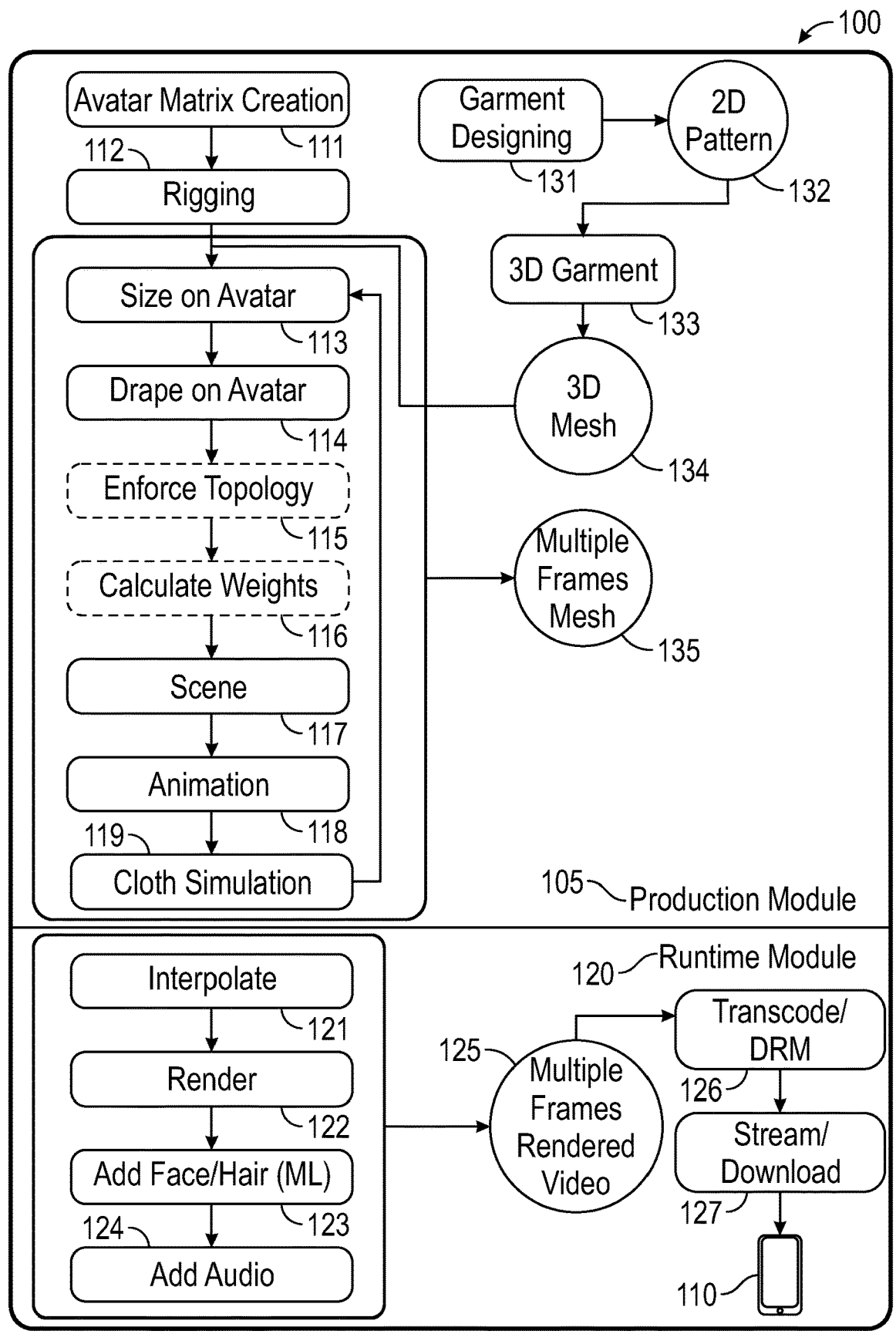

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 depicts an exemplary flowchart illustrating the present invention.

Figure 2:
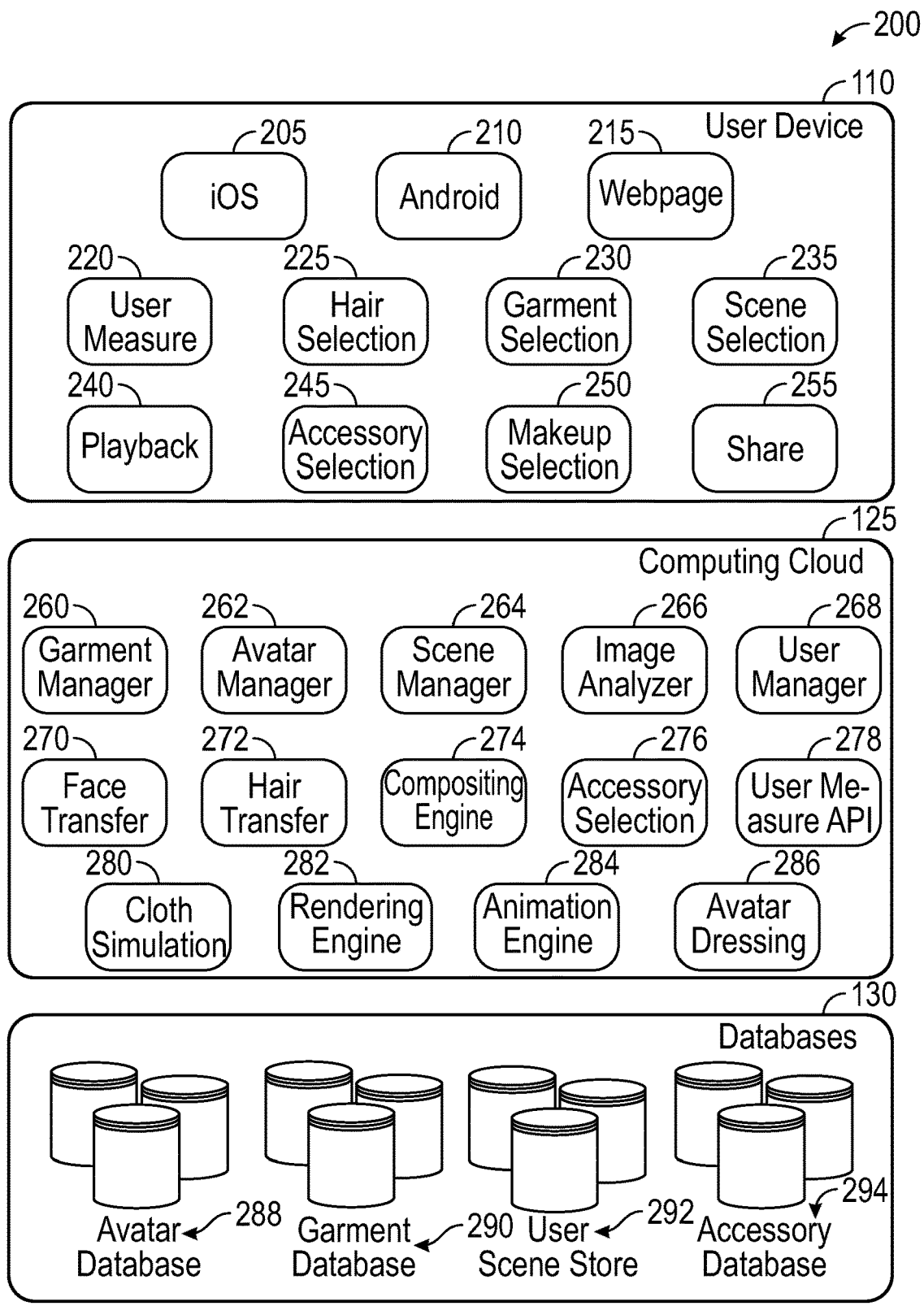

FIG. 2 is a block diagram illustrating modules of a system 200 for implementing various embodiments of the present invention.

Figure 3:
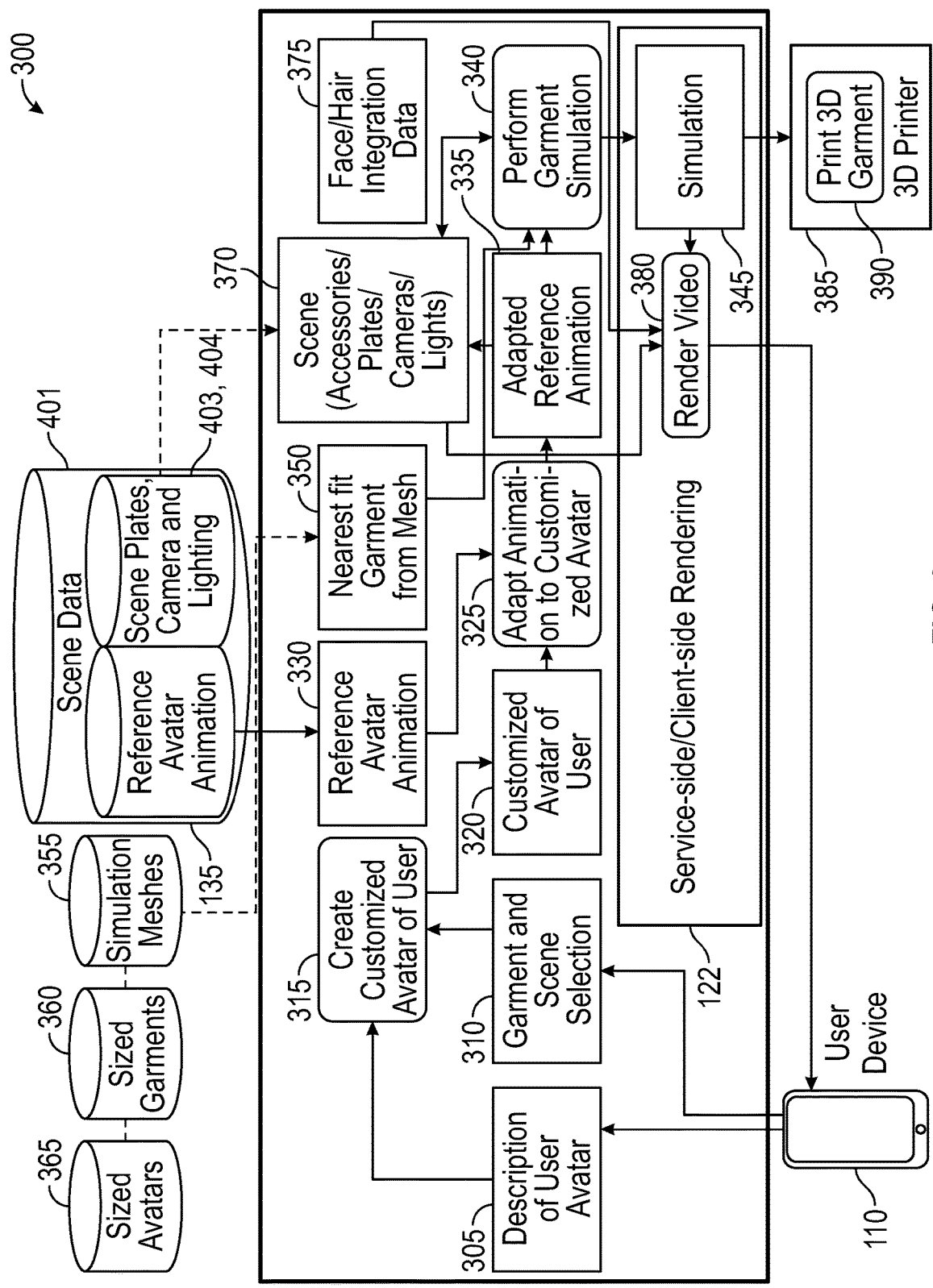

FIG. 3 is a part system, part method diagram showing a runtime session 300 for implementing embodiments of the present invention.

Figure 4:
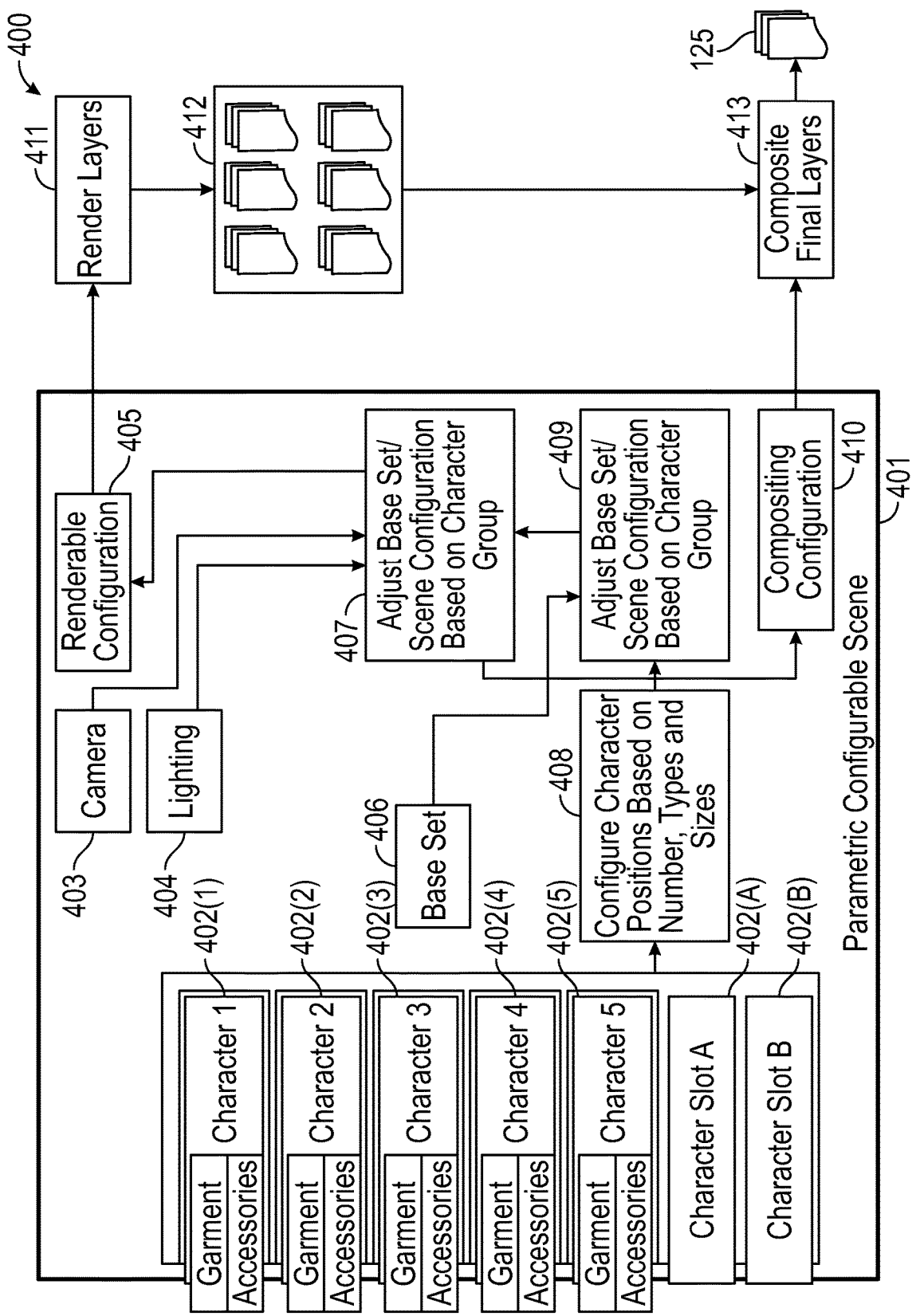

FIG. 4 is a block diagram of a set of modules for implementing a scene assembly 400 of the present invention.

Figure 5:
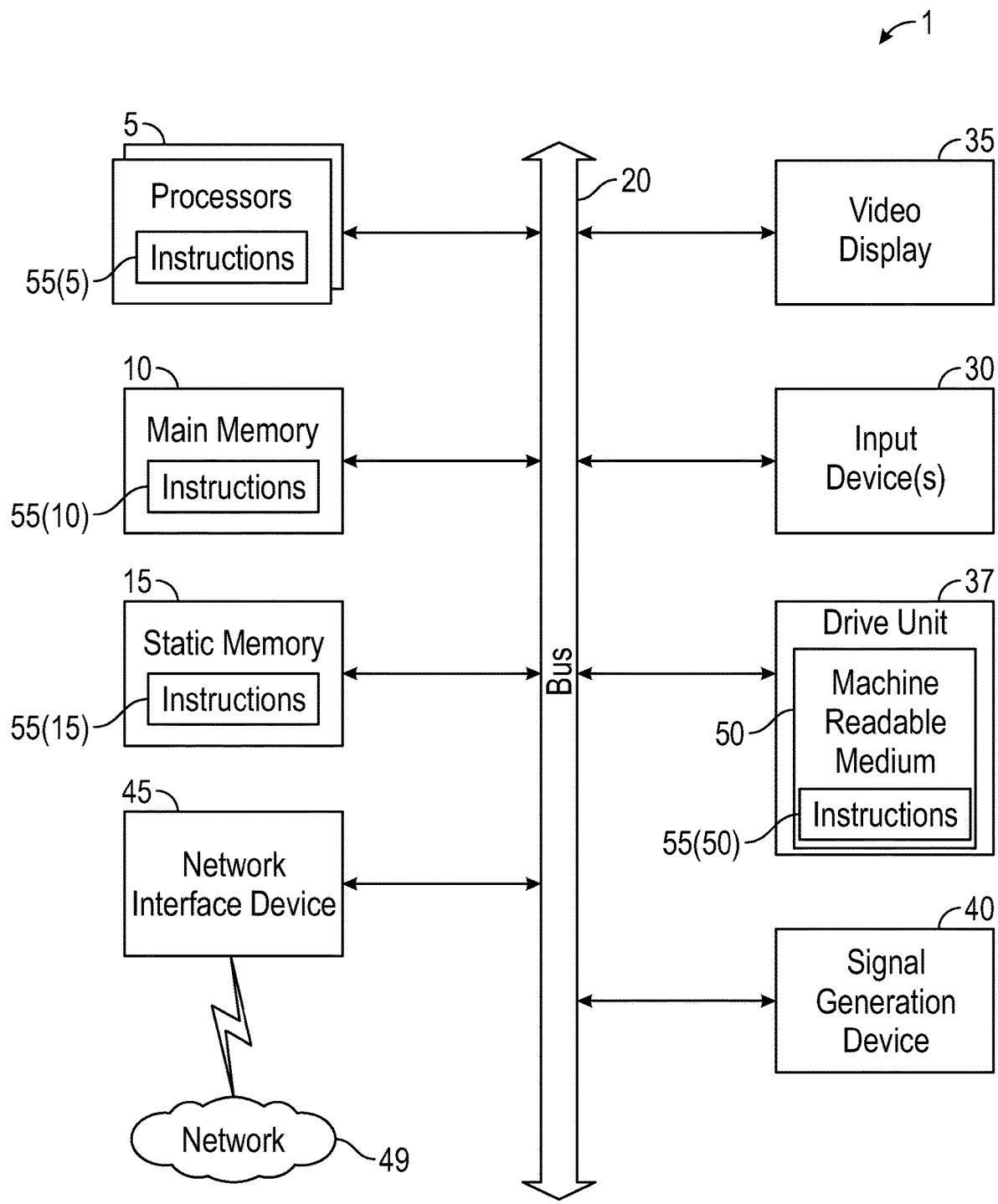

FIG. 5 is a block diagram of a representative computer system that can be used to implement the present invention.

Figure 6:
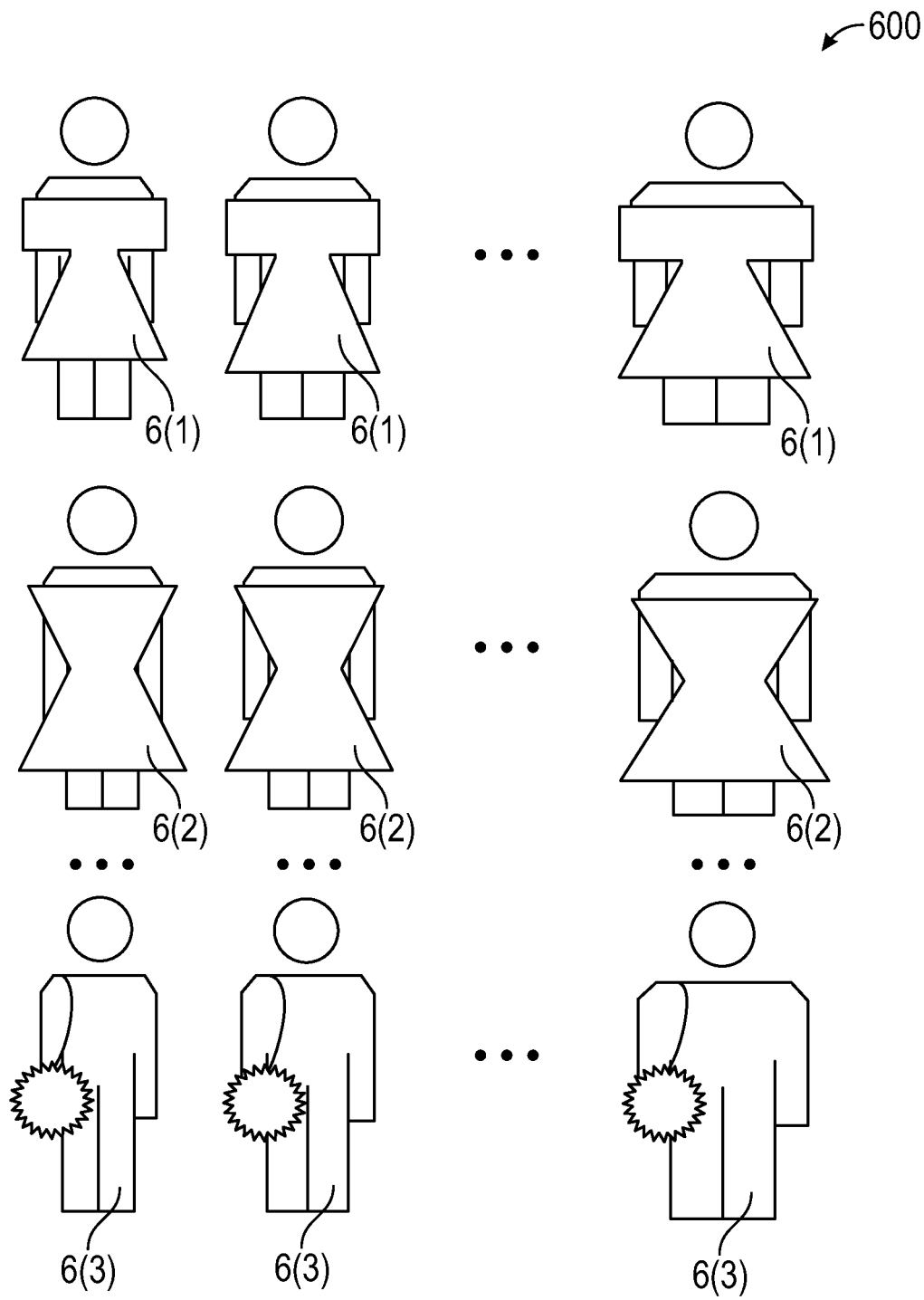

FIG. 6 is a representative avatar matrix 600 as used in the present invention.

DETAILED DESCRIPTION OF PREFERRED EMBODIMENTS

The present invention allows individuals to accurately compare two or more different garments as they would look when worn and fitted on their person, through the generation and simultaneous display of multiple digitally garmented avatars 6. The accuracy of the comparison is ensured by having each garment appear and be fitted on a digital avatar 6 of the user. The techniques presented in this patent application can be used for a variety of purposes. For example, for examining and judging the way a garment would look when worn. Second, to compare real physical garments for purchase, replacing physical showrooms or stores with digital ones, where a digital avatar 6 of a person can try out many different garments and compare them simultaneously. The objectives of this invention, to allow accurate and photorealistic comparisons of different garments (usually digital) on individuals, are met by generating and simultaneously displaying multiple garmented avatars 6.

In various embodiments of the present invention, the avatars 6 to be compared may be placed in scenes or in different settings or locations. So, for example, one can see her avatar 6 wearing a dress and walking down a fashion runway, or doing a twirl, or walking into a red-carpet event, enabling her to compare her avatar 6 wearing different garments in these same scenes or settings. Throughout this specification, the user is assumed to be female, but that does not imply limiting the invention to females, as males can equally take advantage of the present invention.

In many embodiments, the comparisons of garments may occur simultaneously, and be displayed at the same time in the same scene or in separate scenes that are divided on a computing device 110, such as a cell phone, associated with the user. These scenes may be displayed side by side on device 110, or divided across a display device or screen, or be displayed on multiple devices 110. The background scenes, settings, or locations may comprise still images, videos, 3D models, and/or computer-generated graphics. In some embodiments, the user may view multiple instances of the same avatar 6 next to each other in the same scene, but taking up different positions or placements within the scene. Each avatar 6 may be displayed wearing a different garment or different size garment. In various embodiments, celebrities, influencers, or other individuals who publicly share their avatar 6 models, or whose avatar 6 models are otherwise available, may be placed in the same scene as the user's avatar 6, or in separate but identical scenes, and that may assist the user in making comparisons of different garments.

In some embodiments, the user is enabled to make a comparison between two, or among more than two, avatar 6 models of the user, or a non-user individual, wearing different garments; the same garment but with differences (e.g., colors, patterns, styles or other customizations); or different sizes of the same garment. This last embodiment (pertaining to size) can help the user decide what size blouse, dress, or other garment would look best on them.

In various embodiments, the different avatars 6 may be turned or rotated along an axis, allowing the user (or another viewer) to see the garmented avatar 6 from different angles, such as top, bottom, front, back, and sides. In some embodiments, different configurations can be used to compare multiple avatars 6, including having one main large avatar 6 taking up the largest amount of space on the display, and one or more smaller avatars 6 that may be swapped with the large avatar 6 to take the place of the main large sized avatar 6 on the display. In some embodiments, there are multiple large avatars 6 and multiple small avatars 6 placed next to each other, on top of each other, or in other configurations. In numerous embodiments, swiping gestures may be employed on the display, enabling the user to swipe between different avatar 6 models wearing different garments. Depending on the embodiment, swiping can be employed from different directions, such as left to right, right to left, top to bottom, bottom to top, or diagonally. Some embodiments allow 3D (three dimensional) displaying, viewing, and user interaction with the avatar(s) 6. These 3D embodiments can be implemented on a 3D television or monitor, or an Augmented Reality (AR), Virtual Reality (VR), or similar 3D viewing and display device. This 3D displaying, viewing, and interaction can be done with different garments, with garmented or non-garmented avatars 6, and with simultaneous comparisons, whether the avatars 6 be displayed side-by-side or using any other means of comparison known to those of ordinary skill in the art.

In several embodiments, different users may collaborate, e.g., join a similar or identical scene, where two or more users bring their digital avatars 6 to an online location, wearing their respective garments, thus participating in a virtual event. These group or party settings, environments, or events may include any number of scenes, events, or videos which place the avatars 6 of the various users together. The scenes may include being at a beach, a party, a bar, or any other place of interest to the users. Furthermore, these scenes can comprise videos or still images of real places, or scenes that are based on models based on real locations. The multiple participants can interact, chat, comment, vote, or otherwise indicate approval or disapproval of different garments or avatars 6. A participant in such a group setting may display multiple avatars 6 of herself, e.g., with different garments, allowing other participants to select the garment that they think best suits the displaying participant.

In some embodiments, the user can share her avatar(s) 6 wearing one or more garments directly with another person or persons through software applications, on social media, via text messaging, or otherwise transmitting the avatar(s) 6 to the device(s) of these other persons. In some embodiments, the user is enabled to ask these other persons their opinions on which garment looks best on the user, or what the user should wear to a particular event. The event may be a digital (virtual) event or a physical event. The event may include a background scene of the event, or a similar scene or event with the garmented avatar(s) 6 displayed in these scenes. The scenes can be sent to these other persons along with the garmented avatar(s) 6. One format includes allowing the other persons to vote on which garment looks best on the user's avatar 6. These other persons can vote or otherwise respond with likes, thumbs up, thumbs down, or on a sliding scale representing their opinion.

In various embodiments, the comparisons and displaying may be done with the same garment being placed on different people, to allow the participants to compare who looks best in the digital garment. The digital garment may be a digitization of a real physical garment available for sale. In many embodiments, a garment that is placed or worn by an avatar 6 may be purchased or be presented with an option for purchase, whether the garment be a wholly digital garment or a digitize representation of a real physical item. In some embodiments, persons other than the user may share their avatars 6 with the other participants, or have them flagged as publicly available, to allow others to purchase physical garments for them, by trying on different garments and sizes on their avatar 6 and comparing how these garments look on their avatar 6.

Exemplary Method

The user experience typically begins with a user taking at least two photos of herself, such as a front view and a side view. Alternatively, a user may take one or more videos of herself that shows and includes her body. From this, a computer module for photorealistic animation creates a "digital double" or "avatar" 6 of the user, based upon multiple dimensions or measurements of the user. The user can then customize her digital double in real time with augmented reality (AR) tools, such as by adding makeup, changing dimensions, etc. In alternative embodiments, the user takes her measurements with non-photographic means, such as a tape measure, and inputs these measurements directly into the system.

Further, the user's skin tone can be determined at this phase. An algorithm in invoked that automatically determines, based on the skin tone of the user's cheek, a corresponding skin color for the user's other body parts, such as the user's front of hands and back of hands. Skin tone is not consistent across all body parts for most people, so the algorithm allows a realistic rendering of a person's skin tone to be utilized for the user's digital double avatar 6.

The user can then select one or more garments and/or garment sizes for her digital double to wear from her own closet, from an influencer's closet, from a clothing brand's closet, or a store's closet. The user can also digitally resize the garment, select shoes, and select accessories. Further, the user selects a scene (background environment) for her digital double to be located in. In exemplary embodiments, the scene is a runway, private jet, yacht, party, or club. Then the computer system photorealistically renders all of these user choices together. The resulting customized computer animation 125 of the user in the form of a still image, video, 3D object, or VR/AR interactive scene is created. A physics simulation can be performed on the garment so that it flows in a realistic manner in the customized computer animation 125. The final computer animation 125 can then be streamed 127 to the user device 110 for display.

While the present invention is susceptible of embodiment in many different forms, there is shown in the drawings, and will herein be described in detail, several specific embodiments, with the understanding that the present disclosure is to be considered as an exemplification of the principles of the present invention, and is not intended to limit the invention to the embodiments illustrated.

FIG. 1 depicts an exemplary flowchart 100 that may be utilized by the computer system 1 shown in FIG. 5 to implement embodiments of the present invention. Modern computer system 1 are capable of producing customized animated output videos 125 for thousands of users in substantially real time, with minimal to no human intervention. To produce these customized animations 125 efficiently, parts of the process are conducted in advance in a production module 105, and other parts of the process are conducted in real-time in a runtime module 120. The method 100 may also be used to produce digital assets other than 2D videos 125, such as AR/VR scenes, 3D animations, and still images/ photos.

Production Module 105 Exemplary Workflow

In exemplary embodiments, a matrix 600 of several (typically 20) pre-generated avatars 6 of different body shapes and sizes is first computed at step 111, with garments proportionally sized for each avatar's body. While 20 avatars 6 are mentioned for exemplary purposes here, there can be fewer or more avatars 6 in other embodiments. The avatar matrix 600 has a size of n×m, where n and m are each any integer. An example of such an avatar matrix 600 is shown in FIG. 6, which depicts a matrix 600 having three rows of avatars 6 and three columns of avatars 6. The depicted matrix 600 corresponds to an embodiment in which the top two rows show avatars 6 for a female user, and the bottom row shows avatars 6 for a male user. The top two rows can represent a single user wearing different garments, or two different users. In the example matrix 600 shown in FIG. 6, each avatar 6 in the rightmost column is bigger than the corresponding avatars 6 in the other columns; this represents the status of the matrix 135 prior to execution of the interpolation step 121.

For each garment that is selected by the user, the matrix 600 of n×m avatars 6 is generated at step 111. For example, if the user wants to virtually try on 20 garments, n (the dimension of the matrix along the x-axis) may be 4 and m (the dimension of the matrix along the y axis) may be 5. The selected garments are sized on each avatar 6 at step 113 and draped on each of the avatars 6 at step 114. Alternatively, the sizing and draping of avatars 6 can occur as soon as the garment enters or is entered into garment database 290, a database within the set of databases 130, and before the user has selected these garments. In other words, the matrices of n×m garmented avatars 6 may be preloaded and prestored in garment database 290 (see FIG. 2). The set of databases 130 can reside cloud storage, on servers, or as part of other databases, to be accessed by workflow when necessary. In one embodiment, if for example we have three selected or potentially selectable garments, and we are using a matrix of 20 avatars 6 (e.g., in a 5×4 grid), each garment can be assigned to one entire matrix 600 of its own, so that each avatar 6 in each matrix 600 of 20 avatars 6 (with each individual avatar 6 in the group comprising the matrix 600 having a different size and/or shape and/or differences in other dimensions to the other 19) is draped and fitted with one of the three selected garments. In this example, each avatar 6 in a matrix 600 has a different size, shape, or other characteristic than the other 19 avatars 6 in the matrix 600). This gives us a total of 60 avatars 6, comprising 20 avatars 6 for each of the three garments. After each garment is draped 114 on each avatar 6, the avatar 6 is animated 118 and then subjected to cloth simulation 119, resulting in 60 animated videos 135 of garmented avatar 6. An avatar 6 can be rigged 112 as part of the workflow 100, e.g., bones can be added to a 3D model of the avatar 6. The avatar 6 then can move the way that those bones and corresponding joints move, to produce a more realistic human-like animation 135. The animations and movements of each avatar 6 simulate the deformations of the garment fabric material on each avatar 6 wearing it, whether the avatar 6 is stationary or in an animated deforming motion. For an exemplary 15-second animation 125, the entire set of garmented avatars 6 is displayed, running the animation for 15 seconds. This typically requires 360 frames. Instead of a 360-frame animation 125, exemplary embodiments of the present invention may produce 3D animations, AR/VR sequences, still images, or 2D videos as outputs.

Details of the workflow 100 that are not expressly described herein are described in one or more of the priority documents that are part of this patent application.

In some embodiments, all the matrices 600 are created in parallel. After the matrices 600 are created 111, the draping 114 of each selected garment on its matrices 600 of avatars 6, as well as further rigging 112 and animation 118, can be conducted in parallel across all the avatars 6 in all the matrices 600 simultaneously. This simultaneous creation of all the matrices 600 and the execution of the subsequent processes in parallel, reduces the processing times for computer 1, and the corresponding memory space that would otherwise be required.

Having the matrices 600 of garmented avatars 135 reside in a production module 105 separate from runtime module 120 advantageously prevents collisions between the selected garments and user body parts when the final animation 125 is generated at runtime 120. The production steps 105 ensure that all the garments are perfectly draped, fit well, and have proper size; and that no unwanted body parts are visible on the garmented avatar 6.

In exemplary 3D embodiments, the 3D model of a garment 133 that is input into the system is based on a 3D CAD design of the garment. In other 3D embodiments, the 3D model of the garment 133 is derived from photogrammetry techniques.

In some embodiments, accessories can be added to the avatar 6, which increases the size of each avatar matrix 600. For example, if a tall shoe option and a low shoe option are added to each avatar 6, the size of the matrix 600 is doubled. If a flat shoe option, mid heel shoe option, and tall heel shoe option are added to each avatar 6, the matrix 600 triples in size. Similarly, if a purse or other accessory is added to each avatar 6, that again multiplies the size of the matrix 600. Further, for certain types of accessories, a matrix 600 can be used two or more times, but with different animations. For example, if an avatar 6 is holding a clutch or a purse, the arm position in the animated avatar 6 needs to be adjusted accordingly. In many embodiments, multiple three-dimensional photorealistic rendered images and/or video clips are created, representing the universe of complete digital garmented avatars 6.

Another aspect of the production 100 workflow is cloth movement simulation 119 to simulate motion of a garment while an avatar 6 is moving. For example, if the animation 118 is of a user walking down a runway and then doing a 360-degree twirl, the garment on the corresponding avatar 6 is going to flow in a very specific way. In the case where the garment is a long flowy dress, the cloth is going to behave a certain initial way, then when the avatar 6 twirls the cloth is going to behave in a different way. The physics simulation of how the garment moves with the avatar 6, based on the weight of the cloth, the garment and the animation, is a time consuming and computationally expensive calculation. Moving this step 119 to the production 105 workflow simplifies and speeds up the runtime 120 workflow, enabling the computer system 1 to generate the garmented avatars 6 quickly. With this pre-generated cloth simulation 119, for each garment, the computer system 1 produces a matrix 600 (mesh) of animated/simulated garmented avatar 135, and then the computer 1 or the user can choose among the animations 135 at runtime. Each animation 135 typically comprises 360 frames, but there can be fewer or more frames in various embodiments. The techniques disclosed herein can be utilized to generate a photorealistic garmented avatar 6 simulation 135 of any length of time, any number of frames, and any number of frames per second.

Runtime 120 Exemplary Workflow

As discussed above, when a user begins to use the invention, computer 1 first brings in captured body dimensions 220 of the user via still photos, video, or user measurements; or retrieves the user dimensions from a database or other form of mass storage, such as a flash or hard drive, cloud system server, or other database. In many embodiments, the 2D or 3D characteristics 225 of a user's hair and/or face and/or head may all be captured and utilized 123 as well. In several embodiments, computer 1 receives a user's body dimensions 220 and a 3D model of a garment 133 as inputs. In various embodiments, computer 1 also receives a selection 230 of one or more garments and/or garment sizes from the user. In some embodiments, a selection 245 of accessories such as shoes, handbags, and/or hats may also be received as user selections. Then for each garment 230 selected, matrix 600 of animated videos 135 of garmented avatars 6 for that garment is produced, and computer 1 selects two sample avatars 6 that are closest to each other in one of the user's body dimensions. The selected dimension may be the user's height, weight, waist size, bone density, etc. The two closest avatars 6 in that dimension may be, for example, one avatar 6 being a bit smaller and one a bit larger than the user's actual dimension. Alternatively, the avatar 6 may be different from each other in more than one dimension, or in a combination of dimensions. An arbitrarily high number of dimensions of a user's body may be used. In exemplary embodiments, between 7 and 70 dimensions are typically used. The two closest avatars 6 to the user's set of actual dimensions are selected by computer 1. In embodiments where 7 dimensions are used, for each dimension, computer 1 performs an interpolation at step 121 from the two avatars 6 that are closest to the user in that dimension. The animated videos for the two closest avatar 6 for each dimension are interpolated 121 frame by frame until a customized animated video 125 of the user's avatar 6 is created based on all the user's body dimensions that are being utilized to create the avatar 6. For an exemplary 15 second video, this results in 360 frames that are interpolated 121 at runtime. Further, the avatar 6 and the garment draping, are both interpolated 121 at the same time.

After the animated video of the user's body likeness is generated 122, the user's face and hair are customized 123 onto the animated video. Further, the pre-rendered accessories and scenes are composited into the video as well, as well as any audio 124 that is desired to be included in the customized animation 125. By utilizing the matrix 135 of pre-generated avatars 6 as a starting point, at runtime 120 computer 1 simply has to run the interpolation algorithm 121, add 123 face and hair, and render 122. This is a much simpler process than having to generate the entire garmented avatar 6 animation 125 at runtime in real time.

After the interpolation algorithms 121 are run, the garmented avatar 6 is rendered 122. The rendering may be done by computer 1, but may also be done in a cloud server, on GPUs in a cloud farm, or on a user computing device 110. This process can be scaled dynamically. The rendering 122 typically starts with a blank or stock face image, e.g., a bald head. Then, using deep learning, machine learning, or other techniques involving neural networks, the user's face and hair are added at step 123. In exemplary embodiments, machine learning techniques such as GAN (Generative Adversarial Network) are utilized at step 123 to composite the face and hair onto the animated garmented avatar 6 to produce the output customized animation 125.

In many embodiments, a dedicated rendering 122 infrastructure is employed, which allows the system 1 to efficiently substitute in any avatar(s) 6 or any individual(s) and other custom user inputs without adding stress to the rendering 122 and compositing 123 process. In some embodiments, the renderer 122 that is utilized can run and be reconfigured continuously in real-time. This allows the user, for example, to select two garments, remove or modify one, and then select another garment on the fly; or to add, remove, or alter a garmented avatar 6 in real-time in an animated scene 235 that has been selected by the user. The scene 235 can be, for example a runway, where different avatars 6 of the user are added or interchanged continuously in the scene, all while rendered and displayed to be walking along the runway in real-time. The rendering 122 and compositing 123 infrastructure may include a configurable virtual scene 401 with a set, props, lighting 404, and camera(s) 403. These scenes 401 may be pre-set and pre-determined, and may represent an imagined or real location that may support an extended reality (XR) application, namely, any one or a combination of the following techniques: augmented reality, virtual reality, and mixed reality.

In many embodiments, these scenes 401 are configurable by scene manager 264 to support one or more avatars 6 at the same time; create logical scene partitions to enable extremely efficient exploration of an option space (which size to select, for example), often referred to as "wedging", and/or create three-dimensional geometry representations to support various potential scene setups and customizations as expected and/or requested by the user. Parts of the set-up of a scene 235 (scene assembly) may be undertaken and be pre-determined during the production module 105 step, before the user has selected any garments. These pre-set scene assemblies 235 may include utilizing geometries to determine the location of lighting, shadows, background objects, avatar 6, reflections, grids for avatar 6 placements, and the like.

In some embodiments, the scene assembler 264 or assembly algorithm is provided the pre-set pre-determined adjustable scenes 401 from the production module step. The user selects inputs which go into the renderer 122 in addition to other components and variables, and the renderer 122 produces rendered layers. The number of frames may vary depending on the number of avatars 6 in each scene 401, as well as the different variables/components involved for each scene 401. Rendered layers are then composited together using a compositing algorithm running in real-time, producing the desired final composited frame(s) 125. The compositing 123 algorithm may use the same or different components/variables to those used in the rendering 122.

In various embodiments, the scene assembler algorithm 264 allows users to add selections and/or inputs at run-time 120 to generate custom scenes 401. The scene 401 is organized with a variable number of adjustable components/variables per instance or call, and may be modified in real-time. The number of components/variables may depend on user inputs and selections. In several embodiments, the user may select one or more garments as well as features for those garments (e.g., lengths, sizes, colors) in addition to selecting how she wants the garmented avatar 6 to be displayed. For example, the garmented avatar 6 can move in a certain way, take certain actions, and/or be placed in certain positions. Movements may include but are not limited to a twirl, walk, a run, or other movement, and provide for actions or combinations of actions. The user may also select the type of scene. Exemplary types include scenes that are social, interactive, solitary, and image only. The user may also in some embodiments select the weather, location of the scene, location of each avatar 6, and the number of different or identical avatar 6. These user inputs are components/variables that may or may not be included by the scene assembler 264, and affect the scene that is rendered. The scene assembly process can achieve this all in real-time and automatically, without human or manual intervention, to configure, set up, render, composite, and/or display the scene 401. The scene assembler 264 can include all these user inputs/selections 235 as variables, which are then rendered 122 and composited 123 into a scene 401 and displayed to the user in real-time.

In many embodiments, the scene assembler algorithm 264 ensures the correct placement of objects that form the background of the scene 401. Exemplary background objects include trees, mountains, stages, or other objects, such as lighting, shadows, or interactive objects that may affect the avatars 6 and their actions/locations in a scene 401. These background objects may be pre-determined, or the algorithm 264 may be given instructions on how to make placement decisions based on inputs provided by the user and/or pre-set constraints or limitations. The scene assembler 264 may also include grid placements or positioning of avatars 6, which may be modifiable based on the number of avatars 6 and/or user inputs as to how or where they should be positioned. For example, the scene assembly algorithm 264 may allow the placement of ten avatars 6 in a 2×10 grid that is placed over a scene, and in some embodiments may allow the user to select the positioning and placement of each avatar 6 on this grid.

In some embodiments, lighting interactions are supported by the scene assembler 264, with shadows being cast from objects and avatars 6 onto other objects and/or avatars 6. One method the assembler 264 may utilize to support lighting and casting shadows in real-time is to render each avatar 6 individually in each scene 401, but render them as if the other avatars 6 that are not yet rendered are already in the scene. This can be done by setting placeholder objects in the positions where the other avatars 6 will be rendered, to cast shadows on the currently rendered avatar 6. Then as each avatar 6 is completed and rendered, a placeholder object is removed and replaced with the next avatar 6 to be rendered in its place. Some of these processes may be done serially, some in parallel, or some both serially and in parallel. More complicated lighting interactions may also be utilized, e.g., between garments or colors from two garmented avatars 6 reflecting light and color onto one another. The reflected and/or displayed color(s) may be determined from user inputs, including a selected garment's features 230.

In various embodiments, avatars 6 may interact with a scene 401, with objects in the scene 401, or with other avatars 6. One type of movement/interaction with a scene 401 that may be employed by the scene assembler 264 is a set of pre-determined movements and/or motions for each avatar 6. This technique utilizes a representation of space to allow the avatar 6 to carry out the selected or pre-determined acts/motions, which may include a bounding box. An exemplary embodiment includes two avatars 6 walking across the same path. To allow this to happen, a bounding box is created around the space one avatar 6 will move in, preventing other avatars 6 to be rendered in or to interfere with that bounded space at a specific frame when the bounded space/box exists. Bounding boxes can be altered per frame, so that in one frame one area of space may be bounded by a box that only one avatar 6 may move through, and in another frame the boundary box is removed; or a bounding box of another avatar 6 is placed in that area, allowing or excluding other avatars 6 from that area.

Several embodiments deploy naïve compositing setups where each layer is rendered 122 from back to front, with the final image of the video 135 rendered first, and the first image rendered last. In other embodiments, a more complex compositing process 123 is deployed, whereby a z depth-axis is placed that allows the compositor to determine the distance of each object from the camera/observer position, to allow the application to determine how far each object is from the observer/camera. Using the z-axis, the scene assembler 264 is able to send depth instructions to the renderer 282 to render depth, and to the composite algorithm 274 to incorporate depth in compositing 123 the scenes.

The user's face and hair can be added to the animated garmented avatars 135 as a post-production step 123. That is, the animated garmented avatars 135 are rendered 122 with a blank face. Separately, the user's face is made available by module 270. Using machine learning algorithms, the user's face is then moved 123 into the animation of the garmented avatars 135. Machine learning algorithms and models are trained and optimized during production 105, and inference algorithms and GANs are run at runtime 120 to transfer the user's face from a still or short video into the target animation or video 125.

In another embodiment, the avatar animation 135 can be pre-rendered without any garments, just a naked avatar 6 moving, so that an exact position of the face and hair can be determined. Once the user's dimensions 220 are received, a blank avatar 6 and a naked avatar 6 are rendered 122. With this, the computer 1 can create a video of just the user's face. Using machine learning algorithms, models, training, and inference, GANs can generate and then composite 123 the user's face and hair on the target video 135. This technique provides a parallel flow where the algorithms for face and/or hair rendering 122 are run in parallel with the generation of the animated garmented avatars 135, instead of in a second step after the generation of the animated garmented avatars 135. This allows the computer 1 to composite the scene 401 in the final step of the process 120, instead of having to run machine learning algorithms in a final step of the process 120.

In a further embodiment, the user's face is captured as a 3D image and added to each avatar 6 using machine learning algorithms. This may occur in a parallel process to the rendering 122 of the user's avatars 6.

In some embodiments, the user's avatars 6 can be pre-rendered without garments when the user's body dimensions 220 are received by computer 1. In this way, the avatar animation 135 can be pre-rendered with no garment (naked) to get a head position of the user. This way, the face of the user can be rendered 122 in parallel to the generation of the naked avatars 6. As soon as the user's face is received by computer 1, it can begin running the machine learning algorithm, to generate the final customized avatar animation 125. As discussed herein, the rendering 122 and/or compositing 123 steps may occur on the end user's device 110 in certain embodiments. Further, 3D objects may be sent to the target device 110, and even animation 118 and mesh generation 134 may be calculated on device 110. In the case of AR or VR output, mesh animations are sent to the target device 110 along with selection of materials, lighting, and texturing; and final rendering 122 and compositing 123 may occur on the end user device 110.

In some embodiments, there is a precursor video that is transmitted to the user while the user waits for her customized garmented avatars 125 to be generated. This precursor video may be stored in scene selection module 235 on the user's device 110. In one example, a customized animated garmented avatar 6 appears in a scene of a fashion show. The animation may begin with a view of the user walking down a runway of the fashion show on stage. Prior to the animation, the precursor video provides a first-person view showing what the user might view before the selected scene starts. In the example of the fashion show scene, the precursor video shows what the user sees as she drives up to the fashion show in a limo, walks down a red carpet with paparazzi flashing camera lights incessantly, past the bouncers and the big theatre lights. Then the user walks onto a stage, and the rendered animated scene 125 that has been customized for the user begins to roll.

In a final runtime step 124, audio can be added to the rendered scene 401. In some embodiments, the user can select the audio that is added to the scene 401. In other embodiments, many different types of user generated content are available for the user to add to the rendered scene 401. For example, the user can manipulate textures for a garment, including inserting or modifying videos on the garment texture, thus allowing the avatar 6 to do things in the digital world that are not possible in the real world. For example, instead of having a simple plaid pattern on a garment, the avatar 6 can have a moving (video) plaid as a texture of the garment. Further, user generated content can include the ability for users to change the colors of the garment; users can create their own garments, shoes, accessories; etc. There are many different types of user generated content that can be added to the rendered avatars 125 in various embodiments.

After the final customized animation 125 has been generated for the user, it can be sent to user computing device 110 for viewing via streaming or downloading 127 from a web browser or dedicated software application operating on the user computing device 110. The animation may further be encoded 126 with one or more of: a compression technique, DRM (digital rights management) information, encryption, blockchain, digital signature. From this, a digital asset (non-fungible token) is created that can be shared and/or marketed. Further, the output video from the web services or on the client may be transcoded 126 or resized based on specifications of the client device 110 or other parameters. Also, the band, quality, and/or resolution parameters of the animation 125 may be adjusted to allow for optimal playback on device 110, based on the device 110 size, type of processor, capabilities, current network availability, or other characteristics.

FIG. 2 is a block diagram illustrating modules 200 suitable for implementing the present invention. The modules 200 include modules installed on user device 110, modules executing in a computing cloud 125, and a set of databases 130.

The modules installed on the user device 110 may include an operating system (such as iOS 205 or Android operating system 210), a browser for accessing a webpage 215, a user measurement module 220 enabling the user to provide measurements of the user, a hair selection module 225 enabling the user to select/change a hairstyle for the customized avatar animation 125, a scene selection module 235 enabling the user to select a scene 401 for the customized avatar animation 125, and a playback module 240 enabling the user to play back the customized avatar animation 125 on the user device 110. The modules installed on the user device 110 may further include an accessory selection module 245 enabling the user to select/change accessories for the customized avatar animation 125, a makeup selection module 250 enabling the user to select/change makeup for the customized avatar animation 125, and a sharing module 255 enabling the user to share the customized avatar animation 125 with others, for example, on social networks, in a messaging application, via email, etc. The modules of the user device 110 may be executed by a processor located in the user device 110.

The modules residing in the computing cloud 125 are executable modules that are under the control of the administrator of the present invention. The administrator may be, e.g., a department store or a company such as Spree3D Corporation that has licensed the invention to the department store. The computing cloud 125 modules can be accessed by computer 1 shown in FIG. 5. These modules may include a garment manager module 260, an avatar manager module 262, a scene manager module 264, an image analyzer module 266, a user manager module 268, a face transfer module 270, a hair transfer module 272, a compositing engine 274, an accessory selection module 276, a user measure application programming interface 278, a cloth simulation module 280, a rendering module 282, an animation engine 284, and an avatar dressing module 286.

The databases 130 can be accessed by computer 1, and may include an avatar database 288, a garment database 290, a user scene store 292, and an accessory database 294.

FIG. 3 is a partially block, partially method diagram showing steps performed, and results obtained, during an exemplary runtime session 300 of the present invention. On FIG. 5, rectangular blocks signify things, while rectangles with curved edges signify method steps. The runtime session 300 commences with receiving a description 305 of a user avatar 6. The description 305 of the user avatar 6 includes body dimensions 220 of the user and/or images of the user's body. The computer 1 performing this runtime session 200 further receives garment and scene selection information 310 from the user. In step 315, computer 1 creates a customized avatar 320 of the user.

In step 325, computer 1 adapts animation to the customized avatar 320 to generate an adapted reference animation 335. The reference animation 335 may be based on reference avatar animation 330. The reference avatar animation 330 may be taken from scene data 401 (see FIG. 4) or database 130, and may include reference avatar animations 330, scene plates, camera data 403, lighting data 404, etc. In step 340, computer 1 performs garment simulation to provide a simulation 345 (i.e., an interpolated avatar 6 animation). The garment simulation 345 may be performed based on selection of a nearest fit garment 350 from a 3D mesh 134 of garments. The nearest fit garment 350 may be selected from garment database 290 that stores simulation meshes 355 of garments, taking into account sized avatars 365 and sized garments 360.

Computer 1 may further receive at step 370 scene data 401 from the scene database 292. The scene data 401 may include data related to accessories, scene plates, cameras 403, and lights 404. The computer 1 may further receive face/hair integration data 375. Based on the simulation 345, the scene data 401, and the face/hair integration data 375, the system 1 renders a video 125 in step 380, i.e., the customized avatar animation. The rendering step 380 may be performed either client-side (on the user device 110) or server-side (in cloud 125, then displaying the rendered customized avatar animation 125 on the user device 110). The device 110 used for displaying the rendered customized avatar animation 125 may act as an output device for computer 1.

In an example embodiment, computer 1 further includes, or is in communication with, a three-dimensional (3D) printer 385. The 3D printer 385 is configured to construct at step 390 a 3D object based on a model, such as a computer-aided design (CAD) model or a digital 3D model. Computer 1 sends data related to the interpolated garment animation (i.e., an output in a form of the simulation 345) to the 3D printer 385. In step 390, upon receiving the data related to the interpolated garment animation 345, the 3D printer 385 prints a 3D garment in a form of a physical 3D object based on the received data. The received data associated with the simulation 345 is used by the 3D printer 385 as a digital 3D model for printing the 3D garment. The 3D printing may be performed by depositing, joining, and/or solidifying a pre-selected material or combination of materials, and using other applicable technological processes under computer control to create the 3D garment. In that sense, the 3D printer 385 used for 3D-printing the 3D garment acts as an output device for computer 1. The 3D printing may also print a digitally driven loom, stitching, weaving, or patterning process for cloth to make garments in the future.

FIG. 4 is a diagrammatical representation of one embodiment 400 of the present invention that includes a scene 401 showing modules for performing an assembly process followed by rendering 411 and compositing 413 processes. Scene 401 assembly incorporates several initial inputs obtained from the user, including but not limited to the number of characters 402, garments, and accessories. Character 402 positions are then configured by configuration module 408 based on their number, types, and sizes; a character positioning grid is one way this can be carried out. A base set 406 is then configured, which includes a background and scene setting. Then the base scene is adjusted by adjustment modules 407, 409 further by adding camera 403 and lighting 404 objects, as well as the character 402 groups and their associated garments and accessories. The workflow 400 intermediate product is then split into two, a renderable configuration 405 and a compositing configuration 410. Portions of each configuration 405, 410 may work serially or in parallel. The renderable configuration 405 then renders, by rendering module 411, layers of images 412 which are composited by the compositing algorithm by compositing module 413 into finalized layers 414 for the final animation 125.

FIG. 5 is a diagrammatic representation of an example of a computer system 1 that is capable of performing the steps of the present invention. System 1 operates as a standalone device or may be connected (e.g., networked) to other computers 49 via network interface device 45. In a networked deployment, system 1 may operate in the capacity of a server or a client computer in a server-client network environment, or as a peer machine in a peer-to-peer (or distributed) network environment. The computer may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch, or bridge, or any machine capable of executing a set of instructions (sequential or otherwise) that specify actions to be taken by that machine. Further, while only a single computer is illustrated, the term "computer" shall also be taken to include any collection of computers that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), a main memory 10, and static memory 15, which communicate with each other via a bus 20. The computer system 1 may further include a video display 35 (e.g., a liquid crystal display (LCD)). The computer system 1 may also include one or more alphanumeric input devices 30 (e.g., a keyboard), a cursor control device (e.g., a mouse), a voice recognition or biometric verification unit, a drive (e.g., disk drive) unit 37, a signal generation device 40 (e.g., a speaker), and a network interface device 45. The computer system 1 may further include a data encryption module (not shown) to encrypt data for enhancing security.

The disk drive unit 37 includes a computer or machine-readable medium 50 on which is stored one or more sets of instructions and data structures (instructions 55(50)) embodying or utilizing any one or more of the methodologies or functions described herein. Instructions 55 may also reside, completely or at least partially, within main memory 10 and/or within the processor(s) 5 during execution by the computer system 1. The main memory 10 and the processor (s) 5 may also constitute machine-readable media.

The instructions 55 may be transmitted or received over a network 49 via the network interface device 45 utilizing any one of several well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions 55. The term "computer-readable medium" shall also be taken to include any medium that is capable of storing, encoding, or carrying out a set of instructions for execution by the computer 1, and that causes the computer to perform any one or more of the methods of the present invention, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software, hardware, firmware, or any combination of software, hardware, and firmware.

One skilled in the art will recognize that Internet service may be configured to provide Internet access to one or more similar computing devices 1 that are coupled to the Internet service, and that the computing devices 1 may each include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer 1, a server, other programmable data processing apparatus, or other devices to cause a series of operational steps to be performed on the computer, other programmable apparatus or other devices to produce a computer implemented process for carrying out the present invention, such that the instructions which execute on the computer or other programmable apparatus provide processes for implementing the functions/acts described in the present patent application.

While specific embodiments of, and examples for, the inventive system are described above for illustrative purposes, various equivalent modifications are possible within the scope of the system, as those skilled in the relevant art will recognize. For example, while processes or steps are presented herein in a given order, alternative embodiments may perform the steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

The various embodiments described above are presented as examples only, and not as a limitation. The descriptions are not intended to limit the scope of the present invention to the forms set forth herein. To the contrary, the presented descriptions are intended to cover such alternatives, modifications, and equivalents as may be included within the spirit and scope of the present invention as appreciated by one of ordinary skill in the art. Thus, the breadth and scope of an embodiment should not be limited by any of the above-described exemplary embodiments.

What is claimed is:

1. A computer-implemented method for generating and simultaneously displaying multiple photorealistic digitized avatars wearing garments on a single user computing device, said method comprising:
   receiving a selection of multiple garments from a user;
   retrieving multiple body measurements of the user;
   producing at least one digitized avatar for each garment of the multiple garments;
   generating a set of multiple digitized garmented avatars, with each avatar wearing a selected garment and generally conforming to the body measurements of the user by interpolating, body measurement by body measurement, between multiple digitized avatars with similar measurements as the user with respect to each body measurement of the multiple body measurements of the user;
   transmitting the set of multiple digitized garmented avatars to the single user computing device associated with the user; and
   causing to be simultaneously displayed on the single user computing device the set of multiple digitized garmented avatars.

2. The method of claim 1 wherein the multiple digitized avatars are selected based on at least one preselected body measurement.

3. The method of claim 1 wherein the generating step further comprises adding photorealistic imagery of a face and hair of the user to the multiple digitized garmented avatars.

4. The method of claim 1 wherein the method further comprises generating three-dimensional (3D) representations of the multiple garments, the 3D representations including physical attributes of garment materials to enable the 3D representations to move and lay on the at least one digitized avatar in a realistic manner.

5. The method of claim 1 wherein the method further comprises applying a cloth simulation to the multiple garments on the multiple digitized garmented avatars to generate realistic draping and movement characteristics.

6. The method of claim 1 wherein:
   there are multiple users; and
   the set of multiple digitized garmented avatars comprises at least one avatar for each combination of garment and user.

7. The method of claim 1 further comprising the step of inserting at least one of the digitized garmented avatars into a background scene.

8. The method of claim 7 wherein the background scene comprises a still image.

9. The method of claim 8 wherein the background scene comprises a video.

10. The method of claim 9 wherein the video comprises at least one of an augmented reality video and a virtual reality video.

11. The method of claim 1, wherein the method further comprises:
   determining, based on a skin tone of a check of the user, a skin color for the user; and
   applying the skin color to the at least one digitized avatar.

12. The method of claim 1, wherein the method further comprises:

providing, via a user interface of the single user computing device, augmented reality (AR) tools for the user to customize the multiple digitized garmented avatars in real time.

13. The method of claim 12, wherein the AR tools includes at least one of applying makeup, altering the multiple body measurements, or altering a sizing of the multiple garments.

14. A system comprising a processor configured to perform:

receive a selection of multiple garments from a user;

retrieve multiple body measurements of the user;

produce at least one digitized avatar for each garment of the multiple garments;

generate a set of multiple digitized garmented avatars, with each avatar wearing a selected garment and generally conforming to the body measurements of the user by interpolating, body measurement by body measurement, between multiple digitized avatars with similar measurements as the user with respect to each body measurement of the multiple body measurements of the user;

transmit the set of multiple digitized garmented avatars to a computing device associated with the user; and cause to be simultaneously displayed on the computing device the set of multiple digitized garmented avatars.

15. The system of claim 14, wherein the multiple digitized avatars are selected based on at least one preselected body measurement.

16. The system of claim 14, wherein the processor is further configured to add photorealistic imagery of a face and hair of the user to the multiple digitized garmented avatars.

17. The system of claim 14, wherein the processor is further configured to generate three-dimensional (3D) representations of the multiple garments, the 3D representations including physical attributes of garment materials to enable the 3D representations to move and lay on the at least one digitized avatar in a realistic manner.

18. The system of claim 14, wherein the processor is further configured to apply a cloth simulation to the multiple garments on the multiple digitized garmented avatars to generate realistic draping and movement characteristics.

19. The system of claim 14, wherein the processor is further configured to:

determine, based on a skin tone of a check of the user, a skin color for the user; and apply the skin color to the at least one digitized avatar.

20. The system of claim 14, wherein the processor is further configured to:

provide, via a user interface of the computing device, augmented reality (AR) tools for the user to customize the multiple digitized garmented avatars in real time.

* * * * *